United States Patent
Machida

(10) Patent No.: US 9,210,280 B2
(45) Date of Patent: Dec. 8, 2015

(54) INFORMATION PROCESSING APPARATUS, NON-TRANSITORY COMPUTER READABLE MEDIUM STORING PROGRAM, INFORMATION PROCESSING METHOD, AND INFORMATION PROCESSING SYSTEM

(71) Applicant: FUJI XEROX CO., LTD., Tokyo (JP)

(72) Inventor: Hiroaki Machida, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 403 days.

(21) Appl. No.: 13/644,765

(22) Filed: Oct. 4, 2012

(65) Prior Publication Data

US 2013/0215458 A1 Aug. 22, 2013

(30) Foreign Application Priority Data

Feb. 21, 2012 (JP) .................................. 2012-035666

(51) Int. Cl.
*G06F 3/12* (2006.01)
*H04N 1/00* (2006.01)

(52) U.S. Cl.
CPC ....... *H04N 1/00344* (2013.01); *H04N 1/00954* (2013.01)

(58) Field of Classification Search
None
See application file for complete search history.

(56) References Cited

U.S. PATENT DOCUMENTS

| 7,324,469 B2 * | 1/2008 | Wilson .......................... 370/316 |
| 7,570,387 B2 * | 8/2009 | Yamaguchi ..................... 358/1.2 |
| 7,657,582 B1 * | 2/2010 | Cram et al. .................... 707/640 |
| 7,941,844 B2 * | 5/2011 | Anno .............................. 726/17 |
| 8,028,327 B1 * | 9/2011 | Talley et al. ....................... 726/4 |
| 8,312,538 B2 * | 11/2012 | Ogawa ............................ 726/22 |
| 8,336,096 B2 * | 12/2012 | Narusawa et al. .............. 726/19 |
| 8,522,038 B2 * | 8/2013 | Lu et al. ......................... 713/184 |
| 2006/0048187 A1 * | 3/2006 | Lubbers et al. ................. 725/46 |
| 2009/0164606 A1 * | 6/2009 | Epifania et al. ............... 709/219 |
| 2011/0087724 A1 * | 4/2011 | Haga ............................. 709/202 |

FOREIGN PATENT DOCUMENTS

JP A-2011-081710 4/2011

* cited by examiner

*Primary Examiner* — Ashish K Thomas
(74) *Attorney, Agent, or Firm* — Oliff PLC

(57) ABSTRACT

An information processing apparatus includes an acquiring unit that acquires data indicating duration for dispersing access to a management apparatus for each period of time, a specifying unit that specifies the duration corresponding to a time which is designated by a user on the basis of the acquired data, a selection unit that selects an access time to the management apparatus from a time range based on the designated time and the duration specified by the specifying unit according to a predetermined criterion, and a unit that accesses the management apparatus on the basis of the access time selected by the selection unit.

19 Claims, 18 Drawing Sheets

FIG. 3

| PROCESS ID | CONTENT OF PROCESS | TIMING DESIGNATION TYPE | ACCESS DATE AND TIME |
|---|---|---|---|
| P0001 | download (url) | DESIGNATION BY USER | 2012.1.15 12:13 |
| P0002 | upload (log) | DESIGNATION BY DEVICE | 2012.1.15 23:00 |

FIG. 5

| PERIOD OF TIME | DISPERSION DURATION |
|---|---|
| 0 O'CLOCK (0 : 00 ~ 0 : 59) | 1 MINUTE |
| 1 O'CLOCK (1 : 00 ~ 1 : 59) | 1 MINUTE |
| ⋮ | ⋮ |
| 6 O'CLOCK (6 : 00 ~ 6 : 59) | 30 MINUTES |
| 7 O'CLOCK (7 : 00 ~ 7 : 59) | 5 MINUTES |
| 8 O'CLOCK (8 : 00 ~ 8 : 59) | 10 MINUTES |
| 9 O'CLOCK (9 : 00 ~ 9 : 59) | 60 MINUTES |
| 10 O'CLOCK (10 : 00 ~ 10 : 59) | 60 MINUTES |
| ⋮ | ⋮ |
| 17 O'CLOCK (17 : 00 ~ 17 : 59) | 60 MINUTES |
| 18 O'CLOCK (18 : 00 ~ 18 : 59) | 60 MINUTES |
| 19 O'CLOCK (19 : 00 ~ 19 : 59) | 5 MINUTES |

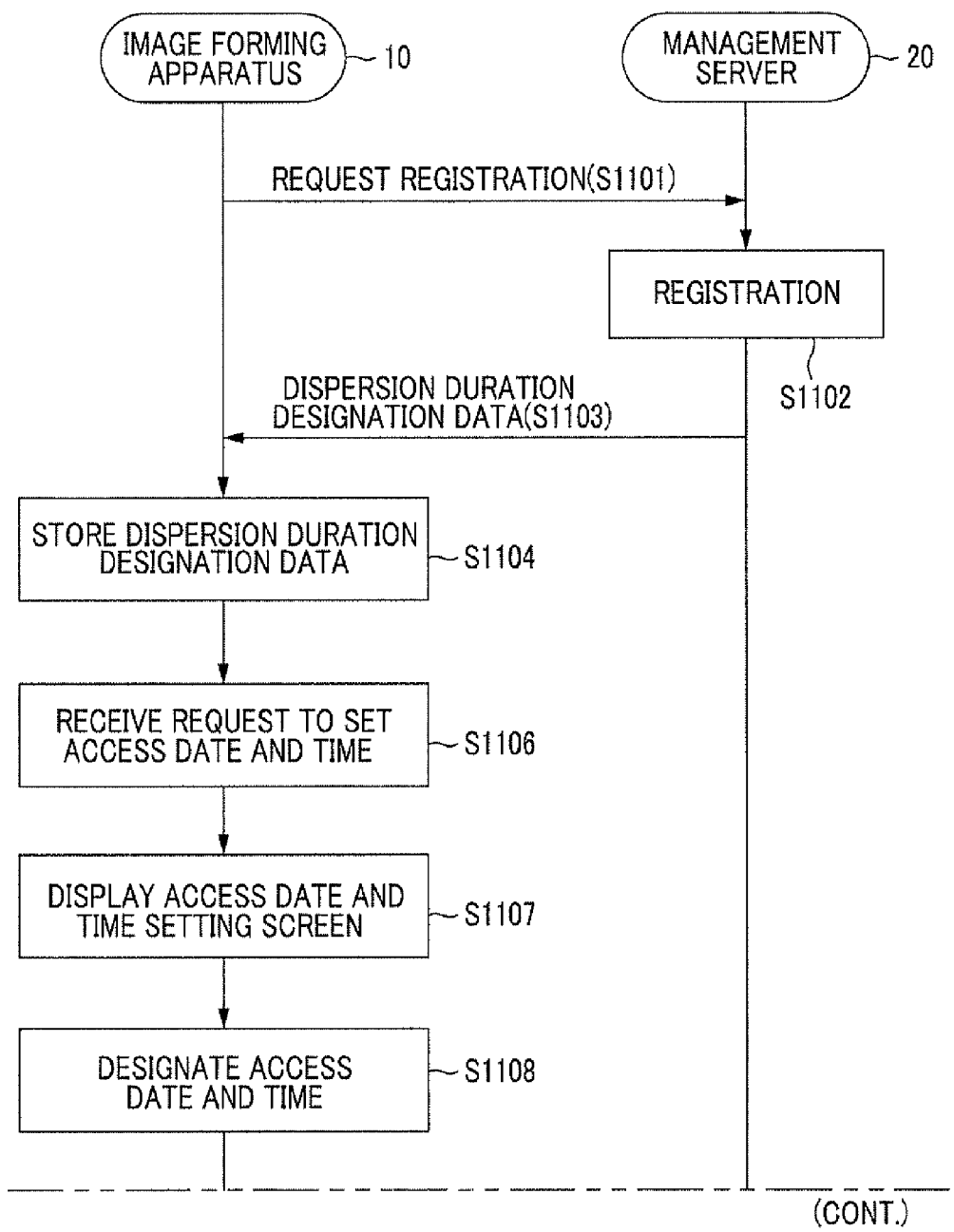

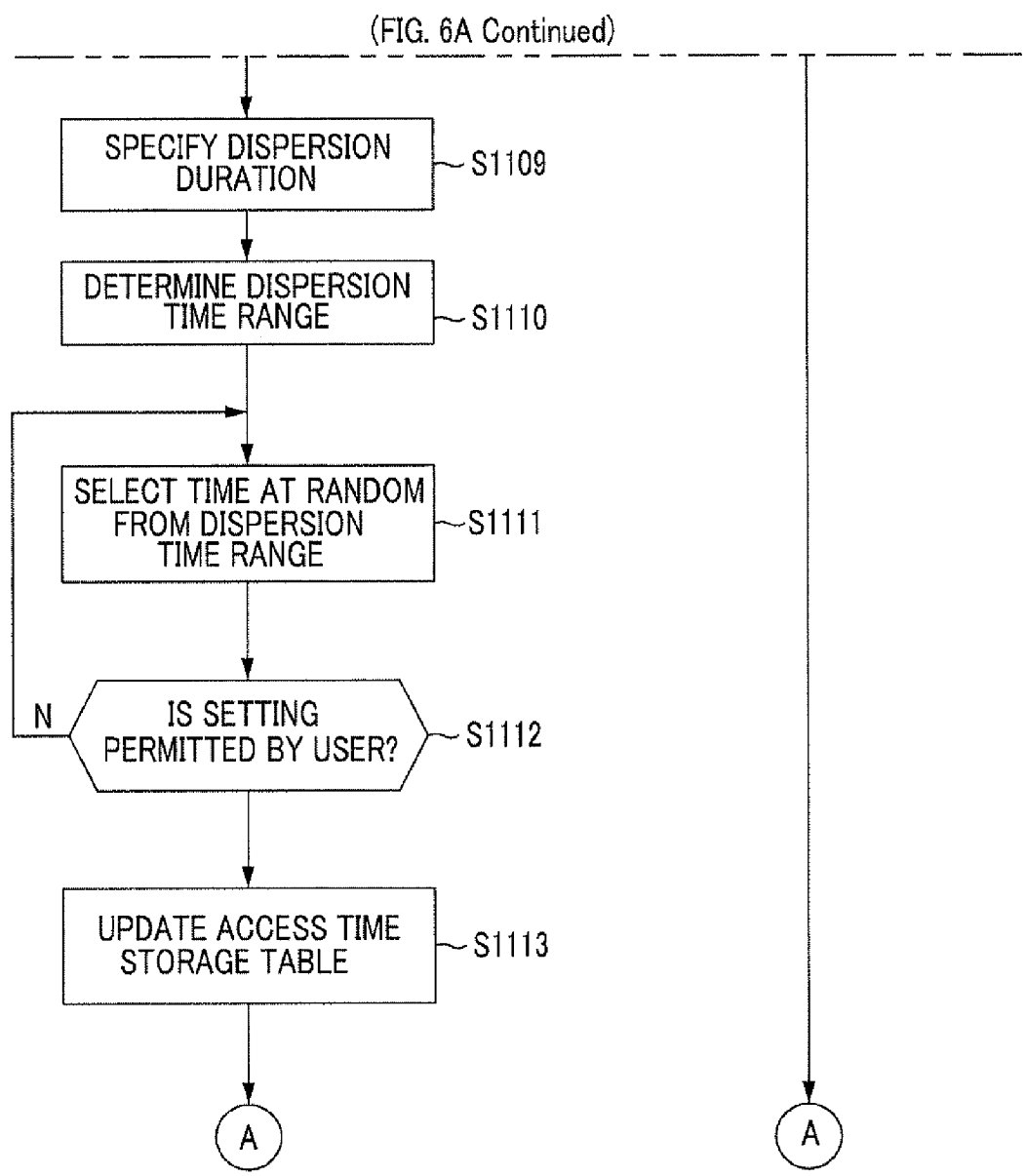

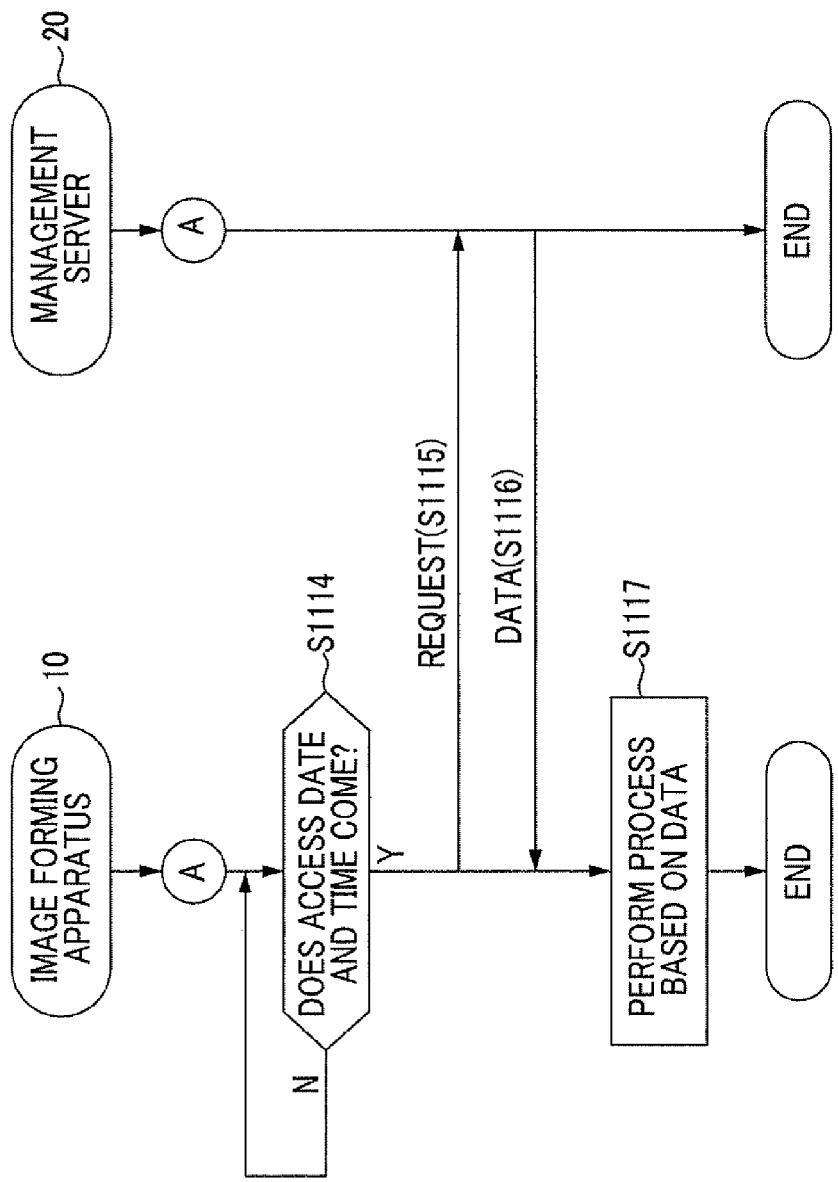

FIG. 7

ACCESS DATE AND TIME SETTING SCREEN

PLEASE INPUT DESIRED ACCESS DATE AND TIME

2012 YEAR  | 1 | MONTH | 2 | 0 | DATE

| 1 | 2 | : | 0 | 0 |    | DECISION |

CONTENT OF PROCESS (UPDATE OF PROGRAM)

CANCEL

FIG. 9

| PROCESS ID | CONTENT OF PROCESS | TIMING DESIGNATION TYPE | ACCESS DATE AND TIME |
|---|---|---|---|
| P0001 | download (url) | DESIGNATION BY USER | 2012.1.15 12:13 |
| P0002 | upload (log) | DESIGNATION BY DEVICE | 2012.1.15 23:00 |
| P0003 | update_program(url) | DESIGNATION BY USER | 2012.1.20 12:07 |

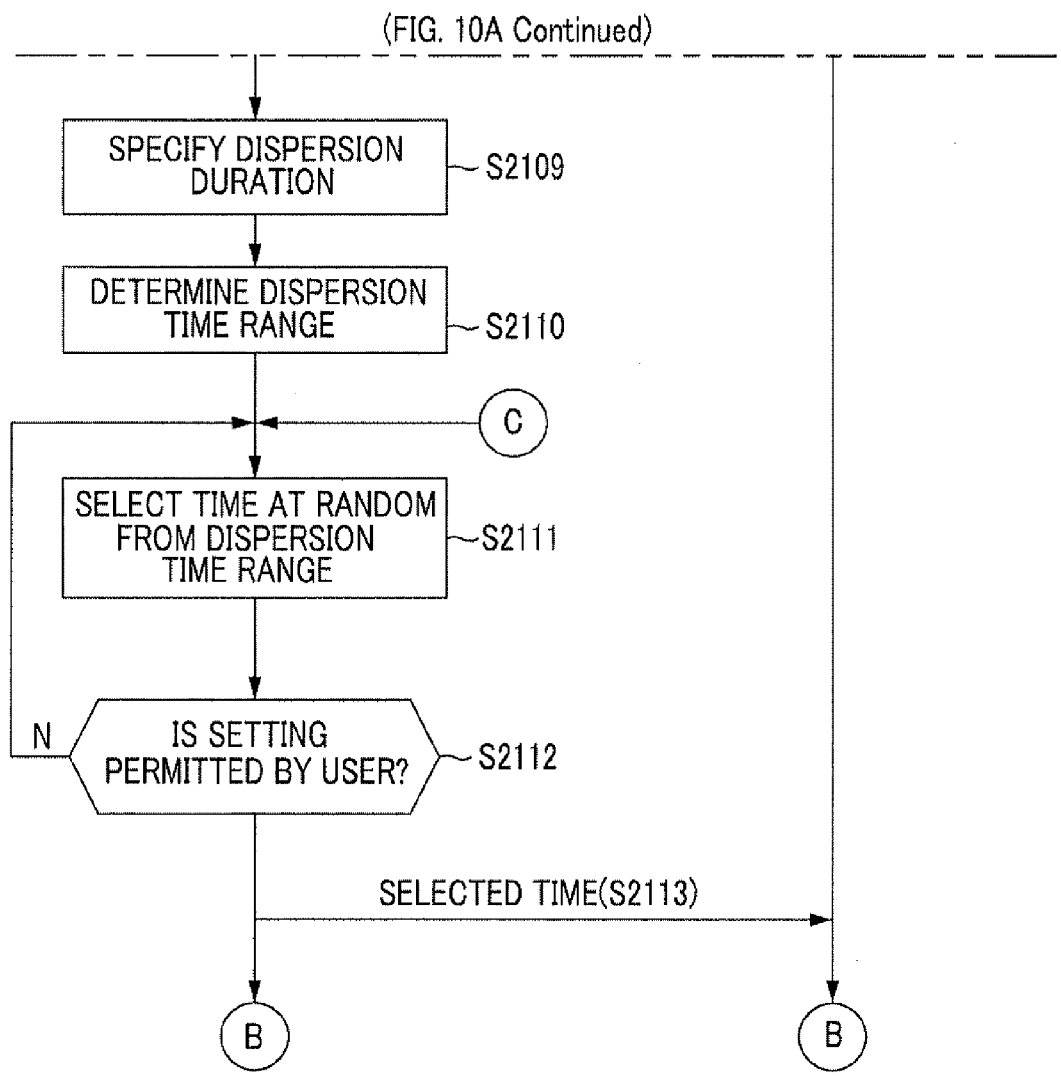

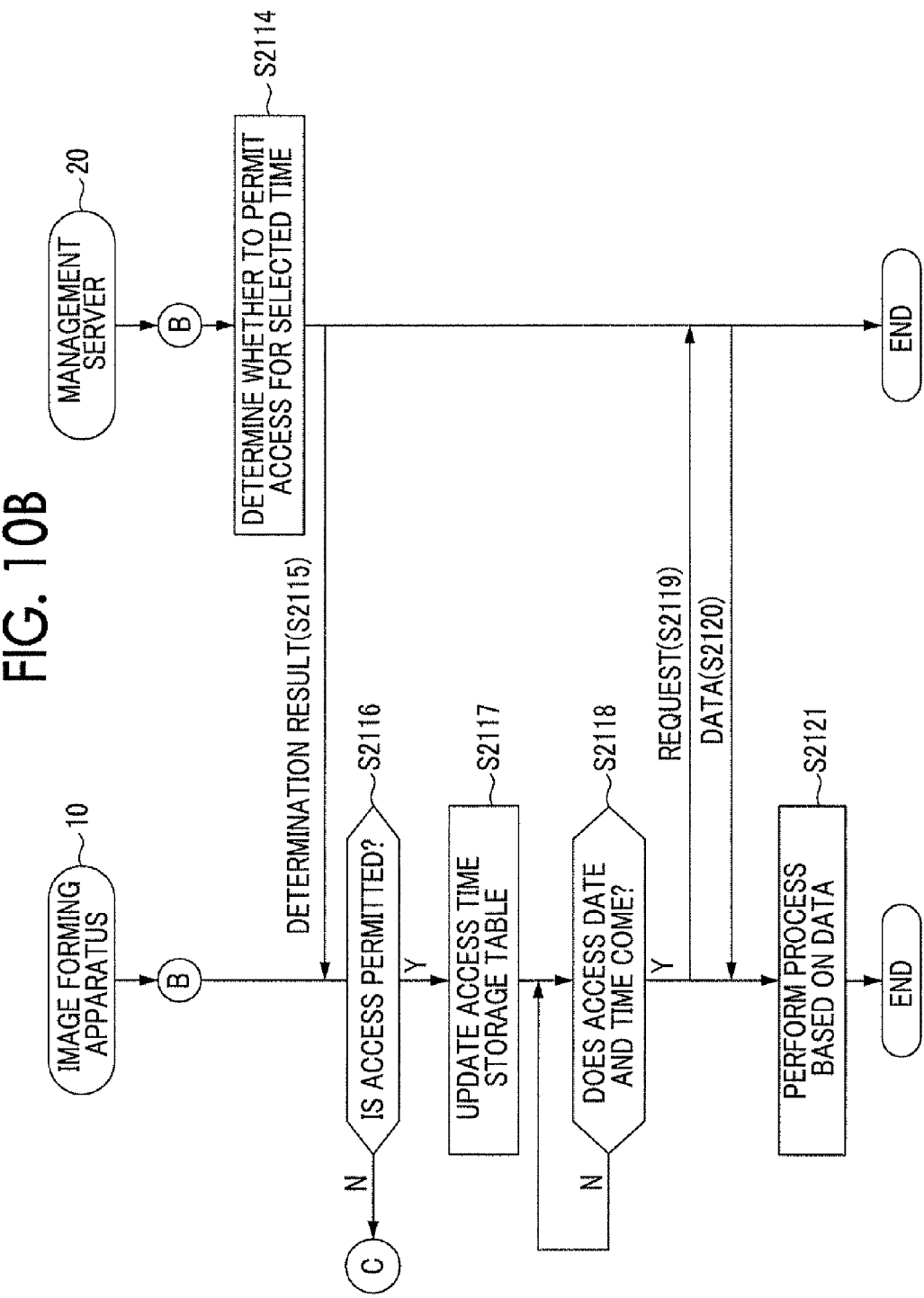

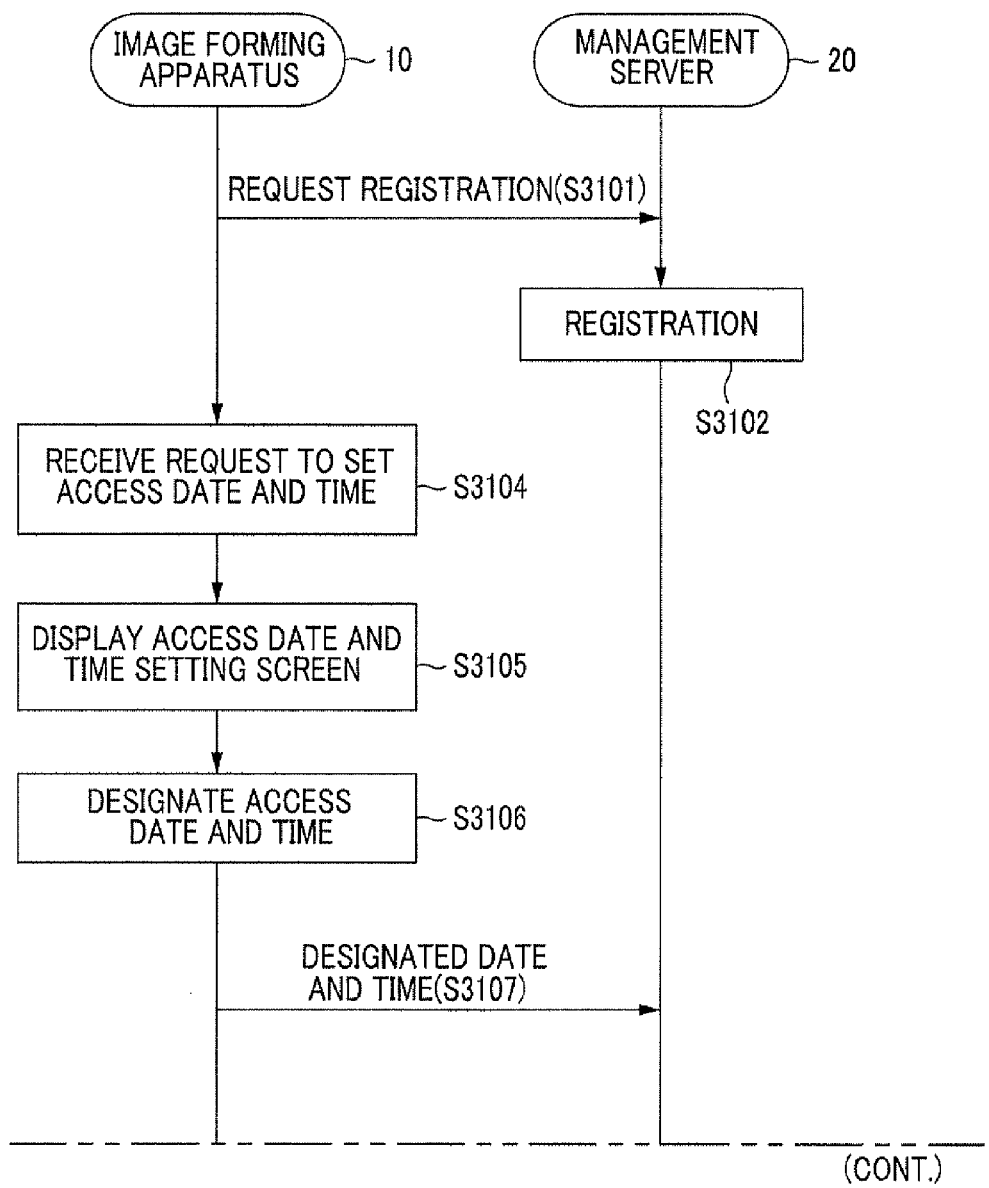

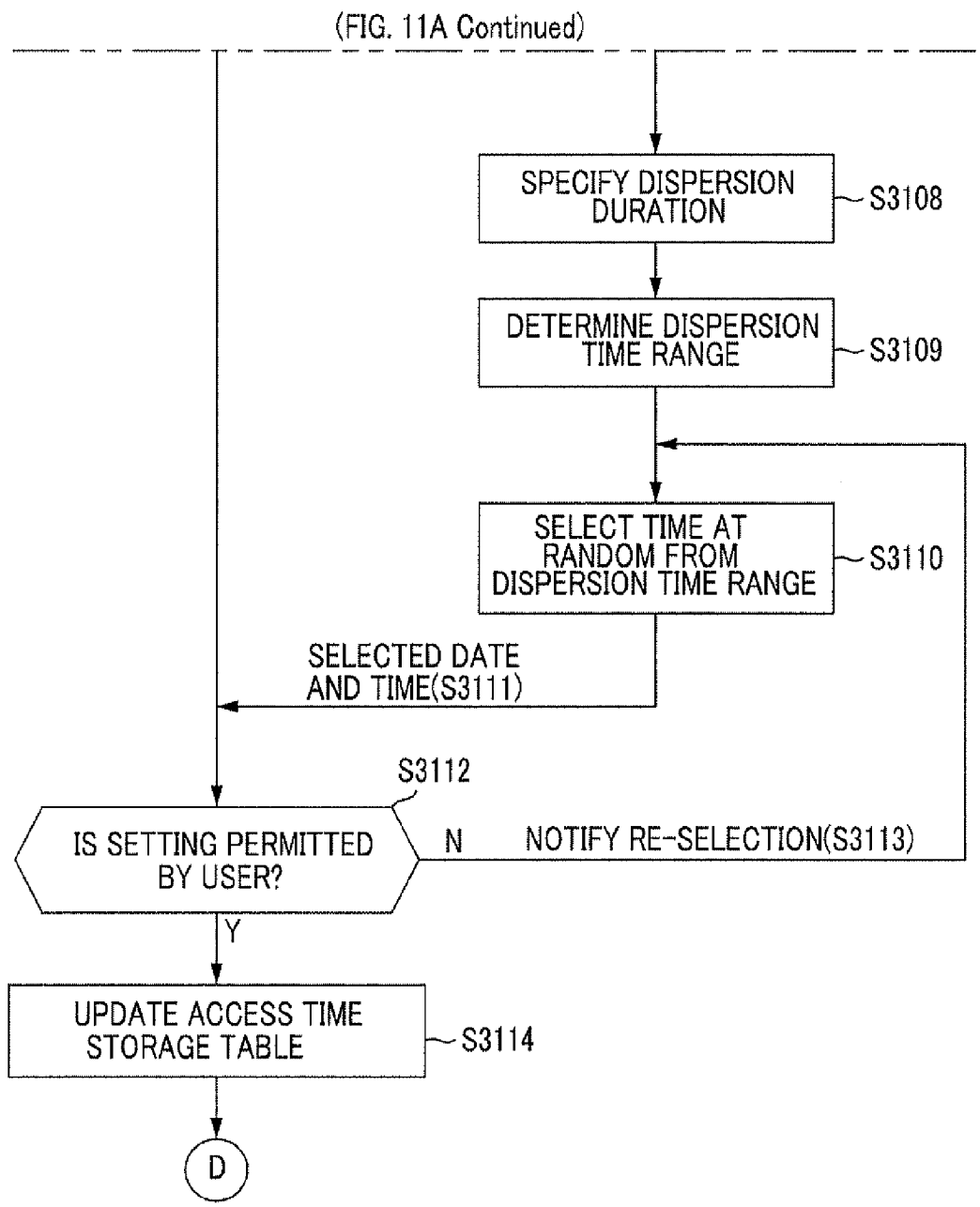

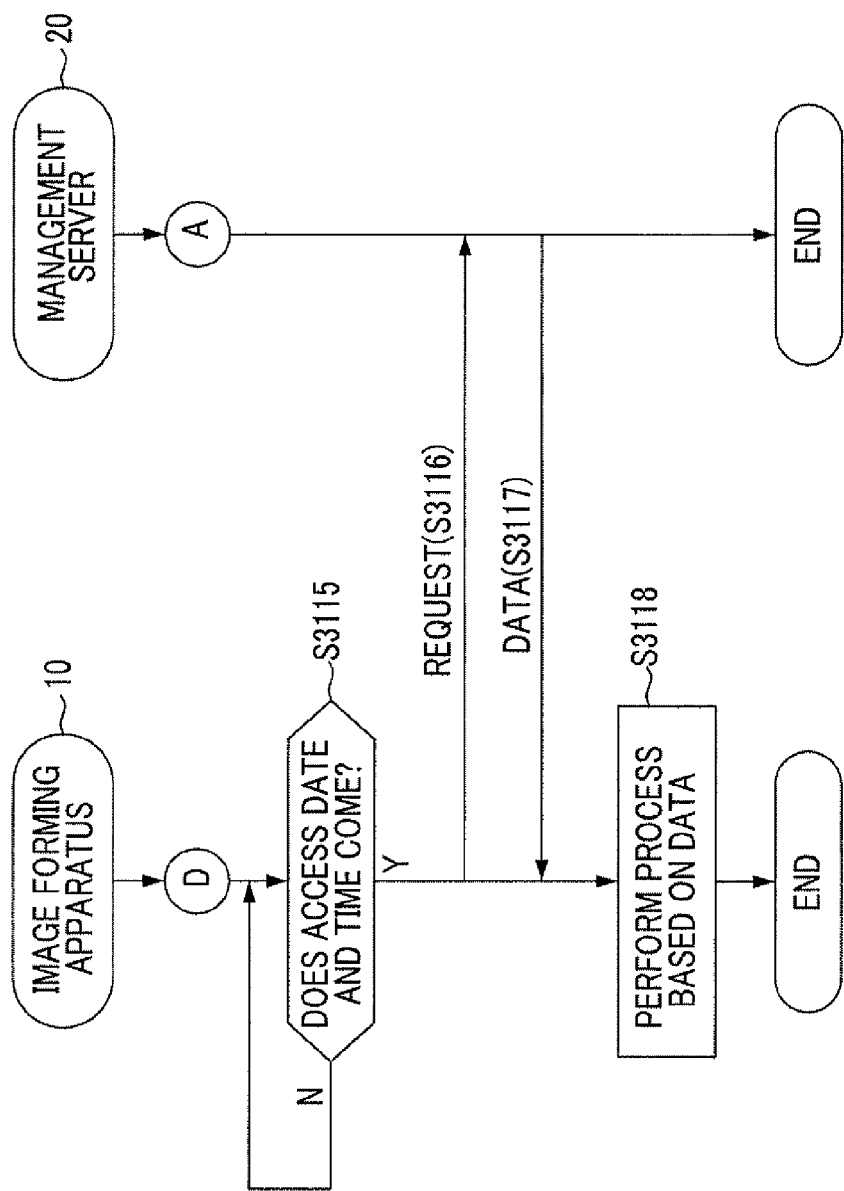

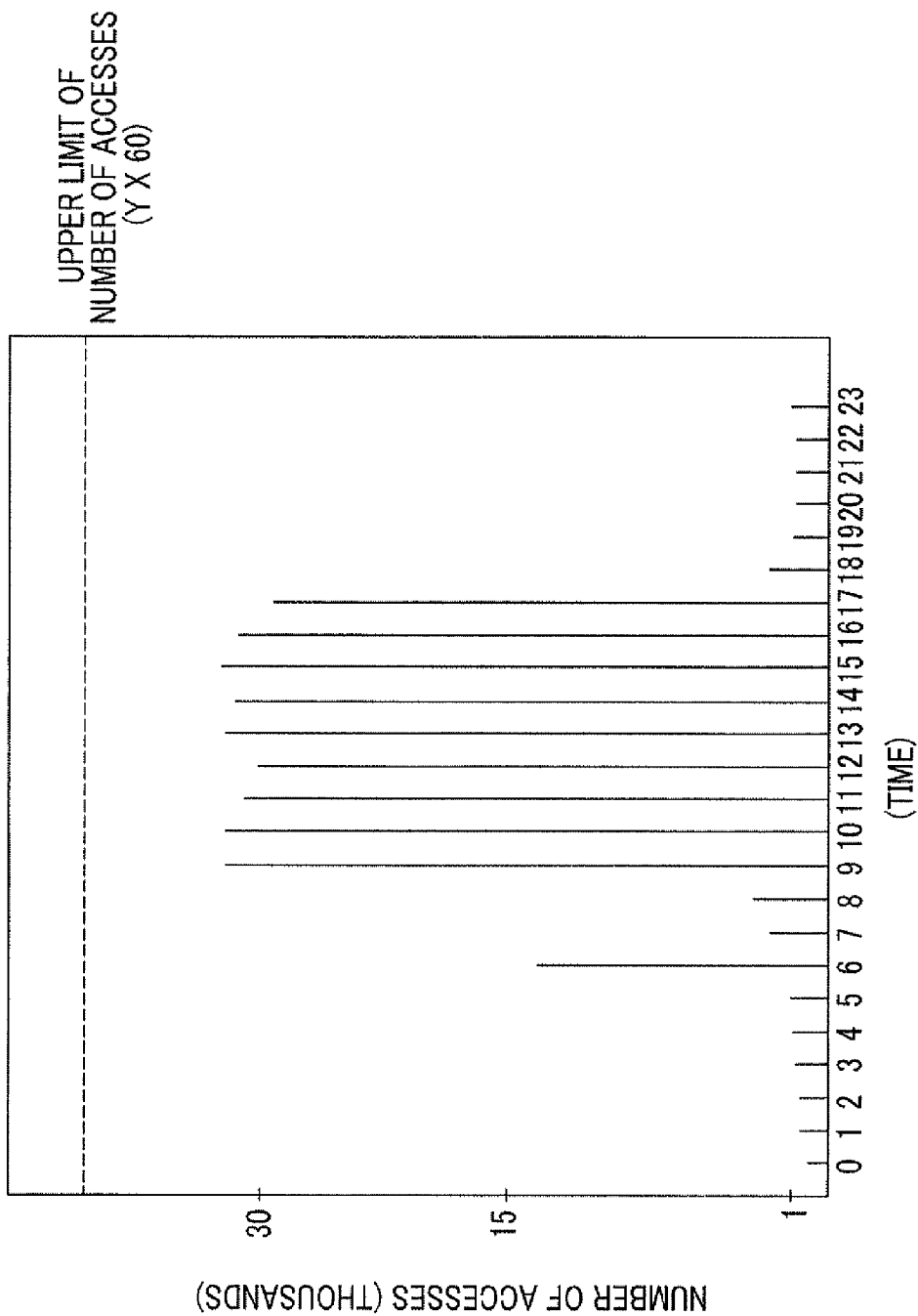

INFORMATION PROCESSING APPARATUS, NON-TRANSITORY COMPUTER READABLE MEDIUM STORING PROGRAM, INFORMATION PROCESSING METHOD, AND INFORMATION PROCESSING SYSTEM

CROSS-REFERENCE TO RELATED APPLICATIONS

This application is based on and claims priority under 35 USC 119 from Japanese Patent Application No. 2012-035666 filed Feb. 21, 2012.

BACKGROUND (i) Technical Field

The present invention relates to an information processing apparatus, a non-transitory computer readable medium storing a program, an information processing method, and an information processing system.

(ii) Related Art

A technique has been proposed in which a device, such as an image forming device, accesses a management device at a predetermined time, transmits log information to the management device, or receives update data from the management device.

For example, when a device update process is performed on the basis of the update data acquired by the access of the device to the management device, the use of the device is interrupted during, for example, the update process. Therefore, it is necessary to access the management device at the time that the user wants and perform the update process. In this case, when the system mechanically disperses the time when each of the plural devices accesses the management device without considering the time that the user wants, the use of the device is likely to be hindered even at the time that the user does not want. When the device accesses the management device at the time designated by the user, the user generally tends to specify a round time. Therefore, access is likely to locally concentrate on a specific time.

SUMMARY

According to an aspect of the invention, there is provided an information processing apparatus including: an acquiring unit that acquires data indicating duration for dispersing access to a management apparatus for each period of time; a specifying unit that specifies the duration corresponding to a time which is designated by a user on the basis of the acquired data; a selection unit that selects an access time to the management apparatus from a time range based on the designated time and the duration specified by the specifying unit according to a predetermined criterion; and a unit that accesses the management apparatus on the basis of the access time selected by the selection unit.

BRIEF DESCRIPTION OF THE DRAWINGS

Exemplary embodiments of the present invention will be described in detail based on the following figures, wherein:

FIG. 3 is a diagram illustrating an example of an access date and time storage table;

FIG. 5 is a diagram illustrating an example of dispersion duration designation data;

FIG. 6A is a sequence diagram illustrating a first example of a process performed by the apparatus management system;

FIG. 6B is a sequence diagram illustrating the first example of the process performed by the apparatus management system;

FIG. 7 is a diagram illustrating an example of an access date and time setting screen;

FIG. 9 is a diagram illustrating an example of the updated access date and time storage table;

FIG. 10B is a sequence diagram illustrating the second example of the process performed by the apparatus management system;

FIG. 11A is a sequence diagram illustrating a third example of the process performed by the apparatus management system;

FIG. 11B is a sequence diagram illustrating the third example of the process performed by the apparatus management system; and FIG. 12 is a diagram illustrating the relationship between the frequency of access to the management server for each period of time and the upper limit of the number of simultaneous accesses.

DETAILED DESCRIPTION

Hereinafter, an exemplary embodiment of the invention will be described with reference to the accompanying drawings.

Figure 1:
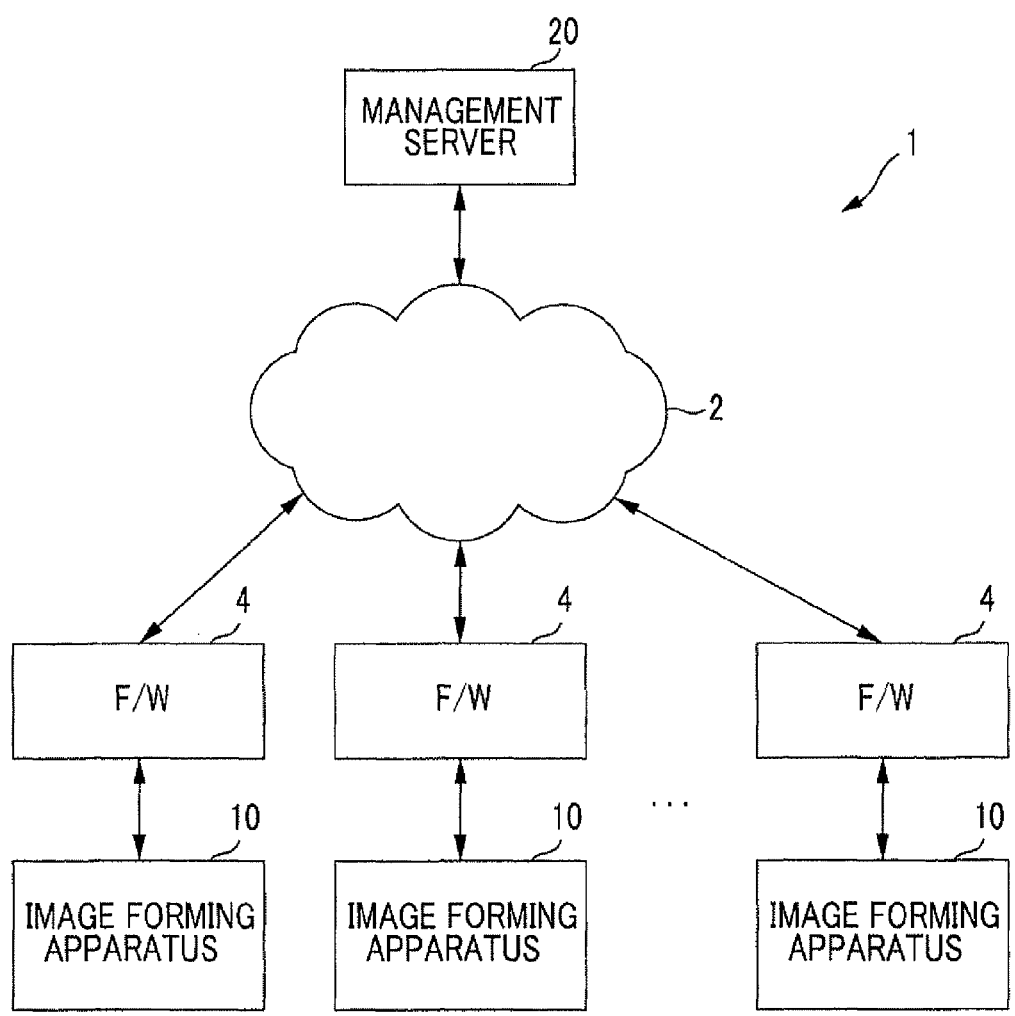
FIG. 1 is a diagram illustrating the structure of an apparatus management system according to an exemplary embodiment.

FIG. 1 is a diagram illustrating the structure of an apparatus management system 1 according to this exemplary embodiment. As shown in FIG. 1, the apparatus management system 1 includes one or plural image forming apparatuses 10 and a management server 20 that manages each image forming apparatus 10 through a network 2, such as the Internet. Each image forming apparatus 10 is connected to the network 2 through a firewall 4 and performs data communication with the management server 20 connected to the network 2. Since the management server 20 is connected to the image forming apparatus 10 through the firewall 4, it is difficult for the management server 20 to start communication with the image forming apparatus 10. Therefore, when transmitting information to the image forming apparatus 10, the management server 20 needs to perform communication as a response to the signal transmitted from the image forming apparatus 10 to the management server 20. In this exemplary embodiment, the image forming apparatus 10 uploads data, such as log information, to the management server 20 or downloads data, such as an update program, from the management server 20 periodically or at a designated time. Next, the structure of the image forming apparatus 10 and the management server 20 will be described.

Figure 2:
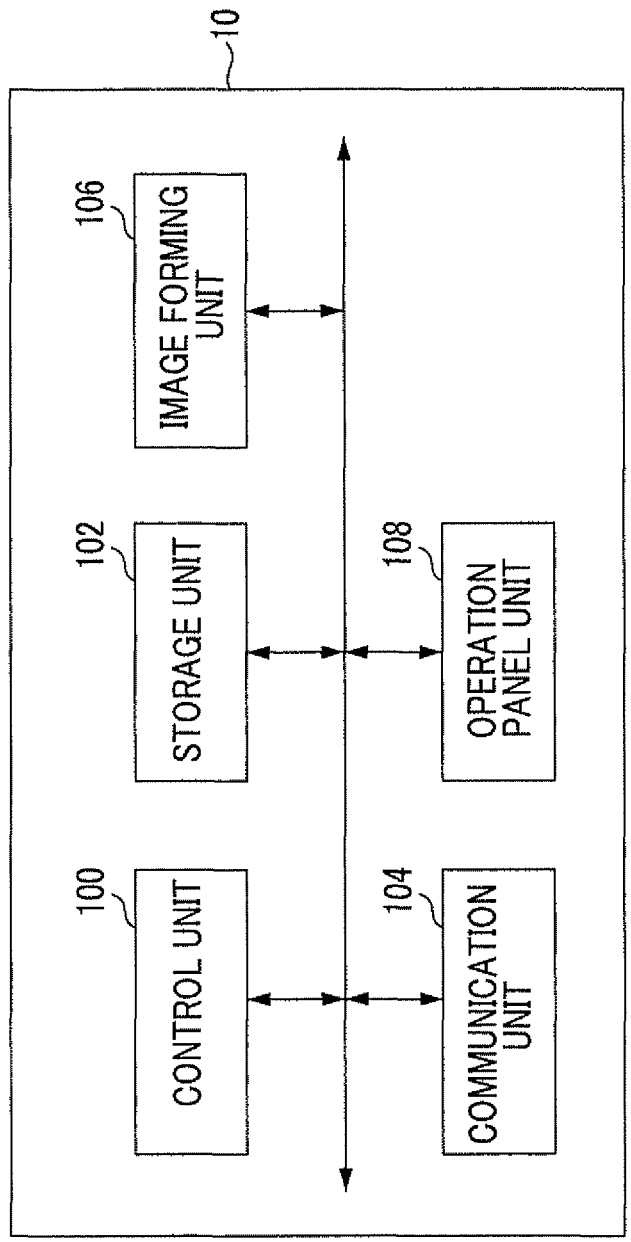
FIG. 2 is a diagram illustrating an example of the hardware structure of an image forming apparatus.

FIG. 2 shows an example of the hardware structure of the image forming apparatus 10. As shown in FIG. 2, the image forming apparatus 10 includes a control unit 100, a storage unit 102, a communication unit 104, an image forming unit 106, and an operation panel unit 108. In this exemplary embodiment, the image forming apparatuses 10 have the same structure.

The control unit 100 includes a CPU (Central Processing Unit). The control unit 100 performs various kinds of arithmetic processing and controls each unit of the image forming apparatus 10 on the basis of a program stored in the storage unit 102.

The storage unit 102 stores a control program or data of the image forming apparatus 10 and is also used as a work memory of the control unit 100. The program may be stored in an information storage medium, such as an optical disc, a magnetic disk, a magnetic tape, a magneto-optical disk, or a flash memory, and then provided to the image forming apparatus 10, or it may be provided to the image forming apparatus 10 through a data communication unit, such as the Internet. Next, an example of the data stored in the storage unit 102 will be described.

FIG. 3 shows an example of an access date and time storage table stored in the storage unit 102. As shown in FIG. 3, the access date and time storage table stores a process ID for identifying a process, the content of the process, a timing designation type, and an access date and time so as to be associated with each other. The content of the process is data in which the content of the process for the management server 20 is described. For example, a process command to download the update program or a process command to upload the log information may be described in the content of the process. The timing designation type is data indicating an access type (user designation type) in which the access date and time to the management server 20 is set on the basis of the designation of the user or an access type (device designation type) in which the access date and time is mechanically set by the device. The access date and time is information indicating the date and time when the content of the process is performed. When the timing designation type is the device designation type, the image forming apparatus 10 may determine the access date and time according to a predetermined criterion (for example, a randomly selected time or a predetermined time). An access date and time setting process performed when the timing designation type is the user designation type will be described below.

The control unit 100 refers to content stored in the access date and time storage table and performs the content of the process associated with the access date and time when the access date and time stored in the access date and time storage table arrives.

The communication unit 104 includes a network card and is connected to the intranet through the network card. The communication unit 104 performs data communication with another apparatus (for example, another image forming apparatus 10 or a computer) connected to an intranet and performs data communication with the management server 20 through the firewall 4 and the network 2.

The image forming unit 106 forms an image on a print medium according to an image formation command (print job) input from the control unit 100. For example, the image forming unit 106 may form an image using a laser printing method or an ink-jet printing method.

The operation panel unit 108 is an input device with a display function which includes a display device, such as a liquid crystal display, and a button-type or a touch-panel-type input unit. The operation panel unit 108 functions as an interactive interface with the user operating the image forming apparatus 10.

Figure 4:
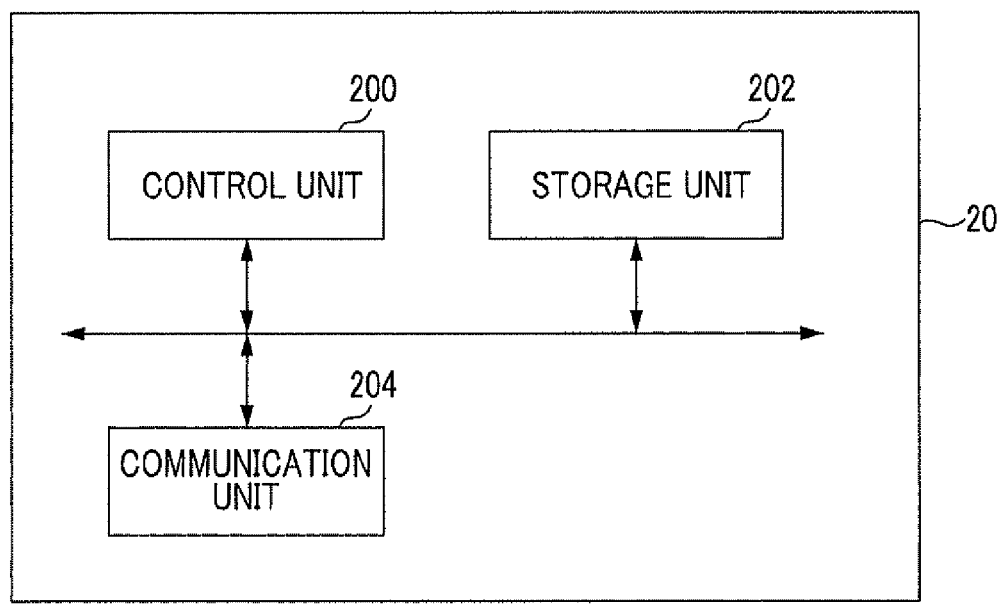
FIG. 4 is a diagram illustrating an example of the hardware structure of a management server.

FIG. 4 shows an example of the hardware structure of the management server 20. As shown in FIG. 4, the management server 20 includes a control unit 200, a storage unit 202, and a communication unit 204.

The control unit 200 includes a CPU (Central Processing Unit). The control unit 200 performs various kinds of arithmetic processing and controls each unit of the management server 20, on the basis of the program stored in the storage unit 202.

The storage unit 202 stores a control program, such as an operating system, or data of the management server 20 and is also used as a work memory of the control unit 200. The program may be stored in an information storage medium, such as an optical disk, a magnetic disk, a magnetic tape, a magneto-optical disk, or a flash memory, and then provided to the management server 20, or it may be provided to the management server 20 through a data communication unit, such as the Internet. Next, an example of the data stored in the storage unit 202 will be described.

FIG. 5 shows an example of dispersion duration designation data. The dispersion duration designation data designates the dispersion duration of an access time to the management server 20 for each period of time. The example of the dispersion duration designation data shown in FIG. 5 includes a table in which each period of time (for example, i (i=0 to 23) o'clock) and a dispersion duration Ti (minutes) are associated with each other. In the example shown in FIG. 5, the period of time is set to one hour, but the period of time may be set to an arbitrary period of time. In addition, the dispersion duration designation data may include one or plural tables which are generated for everyday or date or each combination thereof. A method of generating the dispersion duration designation data will be described in detail below.

The communication unit 204 includes a network card, is connected to the network 2 through the network card, and performs data communication with another apparatus (for example, the image forming apparatus 10) through the network 2 and the firewall 4.

First Example

A first example of the process performed by the apparatus management system 1 will be described with reference to the sequence diagrams shown in FIGS. 6A and 6B.

As shown in FIG. 6A, the image forming apparatus 10 accesses the management server 20 and requests the management server 20 to register the image forming apparatus 10 as a management target (S1101). The management server 20 registers the image forming apparatus 10 (S1102) and transmits the dispersion duration designation data (see FIG. 5) to the registered image forming apparatus 10 (S1103). The image forming apparatus 10 stores the dispersion duration designation data (see FIG. 5) received from the management server 20 (S1104).

For example, when receiving a request to set the date and time when access to the management server 20 is performed from the user in order to download an update program and update the image forming apparatus 10 (S1106), the image forming apparatus 10 displays an access date and time setting screen (see FIG. 7) (S1107).

FIG. 7 shows an example of the access date and time setting screen. As shown in FIG. 7, the content of the process and an input field for designating the access date and time are displayed on the access date and time setting screen. When a "decision" button on the setting screen is pressed after the date and time is input to the access date and time input field and the designated access date and time to the management server 20 is received from the user (S1108), the image forming apparatus 10 specifies a dispersion duration corresponding to the designated date and time (designated date and time) on the basis of the dispersion duration designation data stored in S1104 (S1109).

In S1109, the image forming apparatus 10 may select a table corresponding to the date or day from the dispersion duration designation data on the basis of the designated date and time and specify the dispersion duration set to the period of time including the time of the designated date and time in the selected table. However, when the dispersion duration designation data is the same regardless of the date or day, the image forming apparatus 10 may specify the dispersion duration set to the period of time including the time of the designated date and time.

The image forming apparatus 10 decides the dispersion time range on the basis of the designated date and time received in S1108 and the dispersion duration specified in S1109 (S1110). For example, the image forming apparatus 10 may decide the time range of the dispersion duration including the designated date and time as the dispersion time range. Specifically, when the designated date and time (T), the dispersion duration (W), the dispersion time range (D), $\alpha$, and $\beta$ are equal to or greater than 0, an arbitrary dispersion time range (D) satisfying $(T-\alpha \cdot W) \leq D \leq (T+\beta \cdot W)$ and $\alpha+\beta=1$ may be decided. For example, when the designated date and time (T) is the start time of the dispersion time range (D), $\alpha$ is 0 and $\beta$ is 1. When the designated date and time (T) is the center of the dispersion time range (D), $\alpha$ and $\beta$ are ½. In addition, $\alpha$ or $\beta$ may be selected such that the start time $(T-\alpha \cdot W)$ or the end time $(T+\beta \cdot W)$ of the dispersion time range is a predetermined time.

Then, the image forming apparatus 10 randomly selects the time from the dispersion time range decided in S1110 (S1111), displays a selected date and time based on the selected time on a confirmation screen (see FIG. 8), and asks the user whether to permit setting at the selected date and time (S1112). In the image forming apparatus 10 may generate a random number (or a pseudo random number) and select the time from the dispersion time range on the basis of the generated random number.

Figure 8:
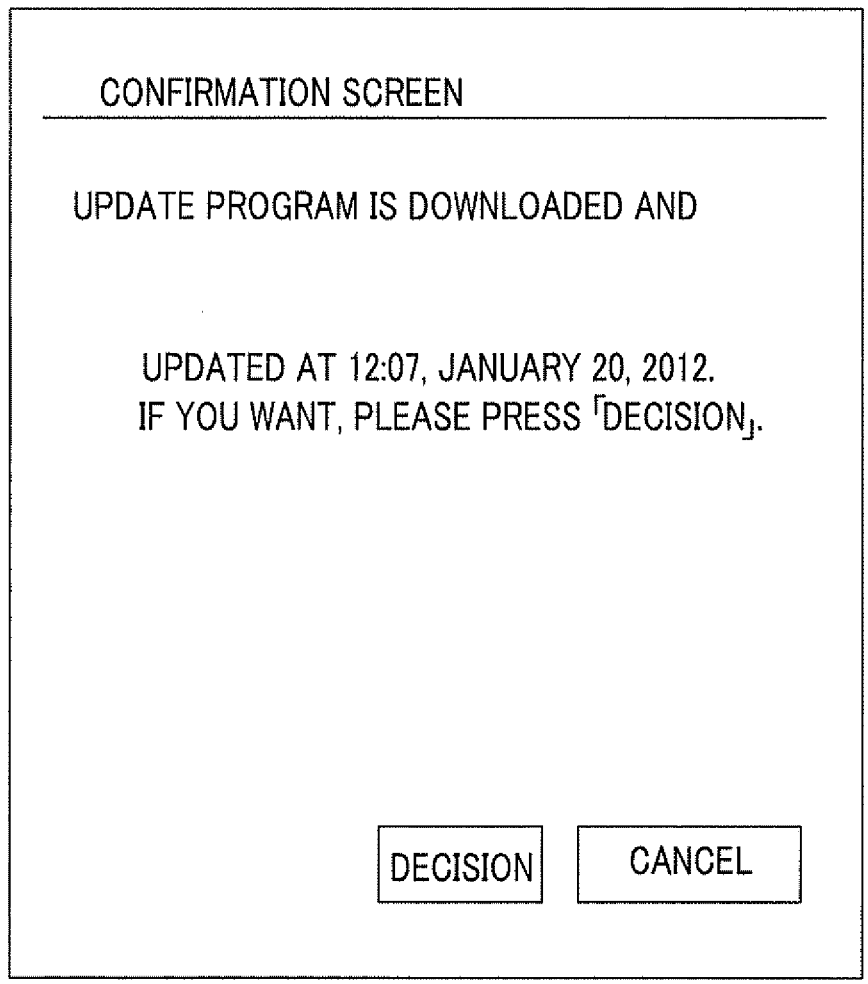
FIG. 8 is a diagram illustrating an example of a confirmation screen.

FIG. 8 shows an example of the confirmation screen. As shown in FIG. 8, the selected date and time selected in S1111 and the content of the process are displayed on the confirmation screen. When a "decision" button is pressed on the confirmation screen and the setting of the selected date and time is permitted by the user (S1112: Y), the selected date and time is stored in the access date and time storage table and the access date and time storage table is updated (S1113).

FIG. 9 shows an example of the access date and time storage table updated in S1113. In the access date and time storage table, the selected data and time permitted by the user is stored as the access date and time so as to be associated with the process ID for identifying a process, the content of the process, and the timing designation type (user designation type).

When a "cancel" button is pressed on the confirmation screen shown in FIG. 8 and the user does not permit setting at the selected date and time (S1112: N), the image forming apparatus 10 returns to S1111 and repeatedly performs the process after S1111 until the setting at the selected date and time is permitted by the user.

Then, as shown in FIG. 65, when the access date and time stored in the access date and time storage table does not arrive (S1114: N), the image forming apparatus 10 waits. When the access date and time stored in the access date and time storage table arrives (S1114: Y), the image forming apparatus 10 transmits a request to the management server 20 on the basis of the content of the process associated with the access date and time (S1115).

The management server 20 transmits data corresponding to the request transmitted from the image forming apparatus 10 to the image forming apparatus 10 (S1116). The image forming apparatus 10 performs the process based on the data transmitted from the management server 20 (S1117). The above is the flow of the process according to the first example.

Second Example

Next, a second example of the process performed by the apparatus management system 1 will be described with reference to the sequence diagrams shown in FIGS. 10A and 10B.

Figure 10A:
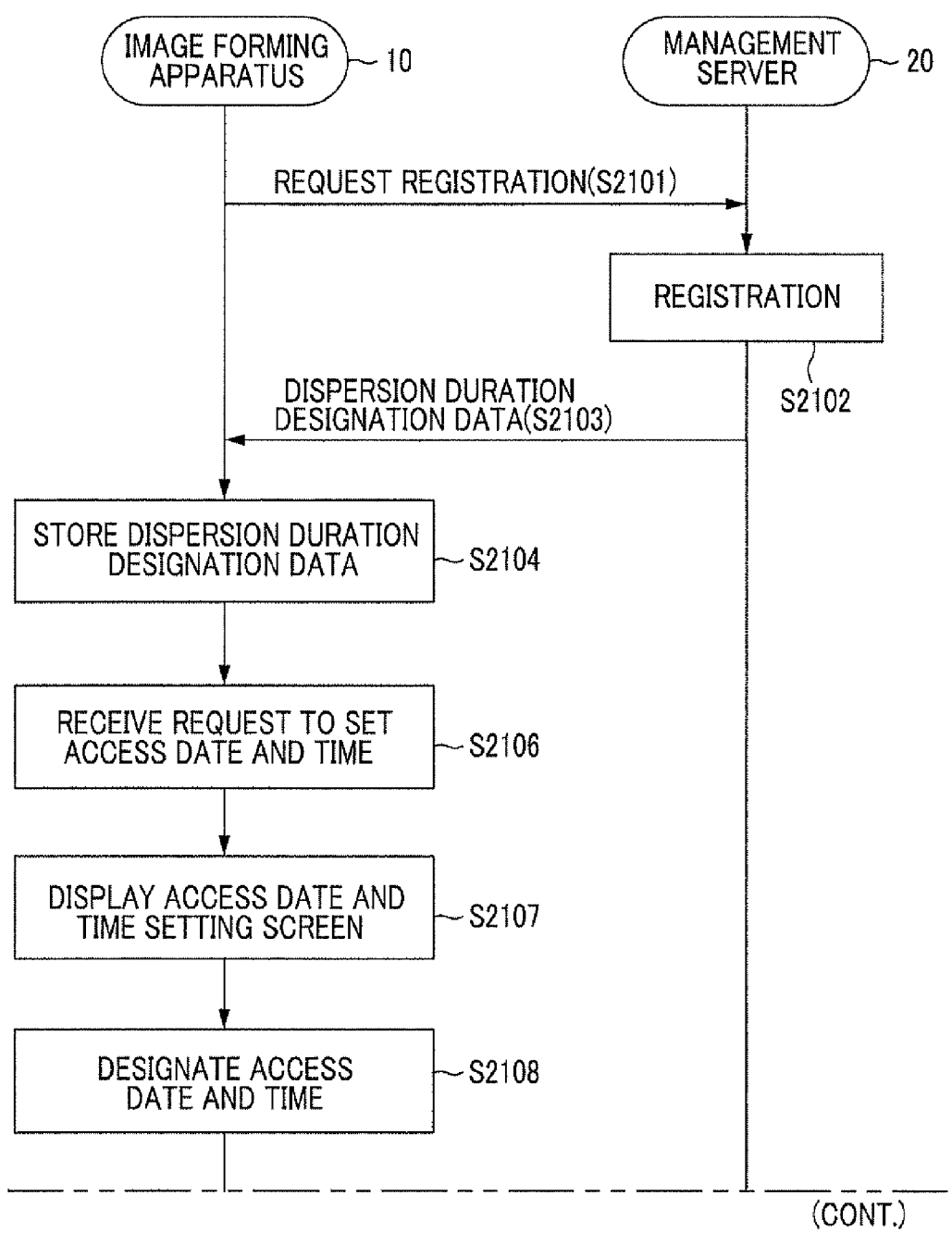
FIG. 10A is a sequence diagram illustrating a second example of the process performed by the apparatus management system.

As shown in FIG. 10A, the image forming apparatus 10 accesses the management server 20 and requests the management server 20 to register the image forming apparatus 10 as a management target (S2101). The management server 20 registers the image forming apparatus 10 (S2102) and transmits the dispersion duration designation data (see FIG. 5) to the registered image forming apparatus 10 (S2103). The image forming apparatus 10 stores the dispersion duration designation data (see FIG. 5) received from the management server 20 (S2104).

For example, when receiving a request to set the date and time when access to the management server 20 is performed from the user in order to download an update program and update the image forming apparatus 10 (S2106), the image forming apparatus 10 displays the access date and time setting screen (see FIG. 7) (S2107).

When receiving the designated access date and time to the management server 20 from the user through the setting screen (S2108), the image forming apparatus 10 specifies a dispersion duration corresponding to the designated date and time on the basis of the dispersion duration designation data stored in S2104 (S2109). Then, the image forming apparatus 10 decides the dispersion time range on the basis of the designated date and time received in S2108 and the dispersion duration specified in S2109 (S2110).

Then, the image forming apparatus 10 randomly selects a time from the dispersion time range decided in S2110 (S2111), displays the selected date and time based on the selected time on the confirmation screen (see FIG. 8), and asks the user whether to permit setting at the selected date and time (S2112). When the user does not permit setting at the selected date and time (S2112: N), the image forming apparatus 10 returns to S2111. When the user permits setting at the selected date and time (S2112: Y), the image forming apparatus 10 notifies the management server 20 of the selected date and time (S2113).

Then, as shown in FIG. 10B, the management server 20 determines whether to permit access at the notified selected date and time (S2114) and notifies the image forming apparatus 10 of the determination result (S2115). For example, in S2114, when the expected number of accesses at the notified selected date and time is equal to or less than a threshold value, the management server 20 may permit access. When the expected number of accesses is greater than the threshold value, the management server 20 may reject access. The expected number of accesses at the notified selected date and time may be calculated on the basis of the number of other image forming apparatuses 10 which permit access at the selected date and time.

When the notified determination result indicates rejection (S2116: N), the image forming apparatus 10 returns to S2111.

When the notified determination result indicates permission (S2116: Y), the image forming apparatus 10 stores the selected date and time transmitted to the management server 20 in the access date and time storage table and updates the access date and time storage table (S2117).

When the access date and time stored in the access date and time storage table does not arrive (S2118: N), the image forming apparatus 10 waits. When the access date and time stored in the access date and time storage table comes (S2118: Y), the image forming apparatus 10 transmits a request to the management server 20 on the basis of the content of the process associated with the access date and time (S2119).

The management server 20 transmits data corresponding to the request transmitted from the image forming apparatus 10 to the image forming apparatus 10 (S2120). The image forming apparatus 10 performs a process based on the data transmitted from the management server 20 (S2121). The above is the flow of the process according to the second example.

In the process according to the second example, when the management server 20 does not perform access at the selected date and time notified by the image forming apparatus 10 (S2114: N), the management server 20 may select a permissible access date and time and notify the image forming apparatus 10 of the selected access date and time. In this case, the management server 20 may select the time when the expected number of accesses which are managed so as to be associated with the time does not reach the threshold value as the permissible access date and time.

Third Example

Next, a third example of the process performed by the apparatus management system 1 will be described with reference to the sequence diagrams shown in FIGS. 11A and 11B.

As shown in FIG. 11A, the image forming apparatus 10 accesses the management server 20 and requests the management server 20 to register the image forming apparatus 10 as a management target (S3101). The management server 20 registers the image forming apparatus 10 (S3102).

For example, when receiving a request to set the date and time when access to the management server 20 is performed from the user in order to download an update program and update the image forming apparatus 10 (S3104), the image forming apparatus 10 displays the access date and time setting screen (see FIG. 7) (S3105).

When the designated access date and time to the management server 20 is received from the user through the setting screen (S3106), the image forming apparatus 10 transmits the received access date and time (designated date and time) to the management server 20 (S3107).

When receiving the designated date and time from the image forming apparatus 10, the management server 20 specifies a dispersion duration corresponding to the designated date and time on the basis of the dispersion duration designation data stored in the management server 20 (S3108). Then, the image forming apparatus 10 decides the dispersion time range on the basis of the received designated date and time and the dispersion duration specified in S3108 (S3109).

Then, the management server 20 randomly selects a time from the dispersion time range decided in S3109 (S3110) and transmits the selected date and time based on the selected time to the image forming apparatus 10 (S3111).

The image forming apparatus 10 displays the selected date and time received from the management server 20 on the confirmation screen (see FIG. 8) and asks the user whether to permit setting at the selected date and time (S3112). When the user does not permit setting at the selected date and time (S3112: N), the image forming apparatus 10 transmits a reselection request to the management server 20 (S3113). When the user permits setting at the selected date and time (S3112: Y), the image forming apparatus 10 stores the selected date and time in the access date and time storage table and updates the access date and time storage table (S3114).

Then, as shown in FIG. 11B, when the access date and time stored in the access date and time storage table does not arrive (S3115: N), the image forming apparatus 10 waits. When the access date and time stored in the access date and time storage table comes (S3115: Y), the image forming apparatus 10 transmits a request to the management server 20 on the basis of the content of the process associated with the access date and time (S3116).

The management server 20 transmits data corresponding to the request transmitted from the image forming apparatus 10 to the image forming apparatus 10 (S3117). The image forming apparatus 10 performs a process based on the data transmitted from the management server 20 (S3118). The above is the flow of the process according to the third example.

Example of Generation of Dispersion Duration Designation Data

Next, a method of generating the dispersion duration designation data will be described in detail. For example, the dispersion duration designation data may be generated on the basis of the frequency of access to the management server 20 for each period of time and the upper limit of the number of accesses to the management server 20 per unit time. Hereinafter, the method of generating the dispersion duration designation data will be described in detail.

FIG. 12 shows the relationship between the frequency of access to the management server 20 for each period of time and the upper limit of the number of simultaneous accesses to the management server 20. In this case, the dispersion duration for each period of time (for example, for every hour) will be calculated as follows. For example, when the basic number of accesses per unit time (for example, 1 minute) around i (i=0 to 23) o'clock is Xi, the upper limit of the number of accesses per unit time (for example, 1 minute) is Y, an expected increase in the number of accesses around i o'clock is Zi, and the dispersion duration around i o'clock is Ti, Ti is set so as to satisfy $Xi+Zi/Ti \leq Y$. When the maximum value of Ti is the dispersion duration Ti, $Ti=Zi/(Y-Xi)$ is established. For example, when the basic number of accesses per hour is 10000, the upper limit of the number of accesses per minute is 1000, and the expected increase in the number of accesses per hour is 50000, Xi=10000/60, Y=1000, and Zi=50000 are established and Ti=60 (minutes) is calculated. In addition, Xi or Zi may be set for each date (for example, the date may be divided into a specific day, such as a meter cutoff day and the other days) or day, or a combination thereof. In this case, the dispersion duration designation data includes one or plural tables in which the dispersion duration of each period of time is set for each date or day, or each combination thereof.

In addition, the dispersion duration designation data may be appropriately updated. For example, when any one of Xi, Y, and Zi is updated, the management server 20 may update the dispersion duration Ti on the basis of the updated value. Specifically, the management server 20 may update the basic number of accesses Xi at a predetermined time interval on the basis of the actual access history from the image forming apparatus 10 and update the dispersion duration Ti of each period of time on the basis of the updated basic number of accesses Xi. In addition, when the processing performance of the management server 20 is changed, the management server 20 may update the upper limit of the number of accesses Y per unit time according to the changed processing performance and update the dispersion duration Ti of each period of time on the basis of the updated upper limit of the number of accesses Y per unit time. Furthermore, even when the predictive value of the expected increase in the number of accesses Zi around i o'clock is changed, the management server 20 may update the dispersion duration Ti on the basis of the updated number of accesses Zi.

When the dispersion duration designation data is updated, the management server 20 notifies the image forming apparatus 10 of the updated dispersion duration designation data. In this case, the image forming apparatus 10 may reset the access date and time on the basis of the updated duration setting data.

In the above-mentioned example, the management server 20 generates the dispersion duration designation data and provides the dispersion duration designation data to the image forming apparatus 10. However, apparatuses other than the management server 20 may generate the dispersion duration designation data and provide the duration designation data to the image forming apparatus 10.

When a failure occurs in the management server 20 after the image forming apparatus 10 notifies the management server 20 of the access date and time, a request to cancel access may be transmitted to the image forming apparatus 10 with the access date and time within an expected failure recovery period. The image forming apparatus 10 receiving the request to cancel access may cancel the access process to the management server 20, or it may hold the access process, notify the management server 20 that the access process is held, cancel the held state when a recovery notice is received from the management server 20 until the access date and time, perform access, and cancel the access when the recovery notice is not received from the management server 20 until the access date and time.

In the apparatus management system 1 according to the above-described exemplary embodiment, for a user designation type of access, the access date and time to the management server 20 is dispersed in the dispersion time range which is determined considering the number of accesses to the management server 20 at the time designated by the user and the processing performance. Therefore, it is possible to prevent the concentration of access to the management apparatus while enabling the user to access the management apparatus at the desired time.

However, the invention is not limited to the above-described exemplary embodiment. In this exemplary embodiment, the image forming apparatus is managed by the management server. However, for example, the management server may manage other information processing apparatuses, such as scanners or computers.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
a processor configured to act as:
an acquiring unit that acquires data from a management apparatus indicating a respective duration for dispersing access to the management apparatus for each of a plurality of periods of time;
an inputting unit that inputs time to access the management apparatus, which is designated by a user;
a specifying unit that specifies the duration corresponding to the time which is designated by the user on the basis of the acquired data;
a selection unit that selects an access time to the management apparatus from a time range based on the designated time and the one of the respective durations specified by the specifying unit; and
a unit that accesses the management apparatus on the basis of the access time selected by the selection unit.

2. The information processing apparatus according to claim 1, further comprising:
a unit that notifies the user of the access time selected by the selection unit and inquires of the user about permission,
wherein the selection unit selects the access time to the management apparatus from the time range again according to the predetermined criterion until the permission is obtained from the user as a result of the inquiry.

3. The information processing apparatus according to claim 1, further comprising:
a notifying unit that notifies the management apparatus of the access time selected by the selection unit,
wherein, when the notified access time is rejected by the management apparatus, the selection unit selects the access time to the management apparatus from the time range again according to the predetermined criterion.

4. The information processing apparatus according to claim 2, further comprising:
a notifying unit that notifies the management apparatus of the access time selected by the selection unit,
wherein, when the notified access time is rejected by the management apparatus, the selection unit selects the access time to the management apparatus from the time range again according to the predetermined criterion.

5. The information processing apparatus according to claim 1,
wherein the data is determined such that the duration of the period of time in which a frequency of access to the management apparatus is high is longer than the duration of the period of time in which the frequency of access to the management apparatus is low.

6. The information processing apparatus according to claim 2,
wherein the data is determined such that the duration of the period of time in which a frequency of access to the management apparatus is high is longer than the duration of the period of time in which the frequency of access to the management apparatus is low.

7. The information processing apparatus according to claim 3,
wherein the data is determined such that the duration of the period of time in which a frequency of access to the management apparatus is high is longer than the duration of the period of time in which the frequency of access to the management apparatus is low.

8. The information processing apparatus according to claim 4, wherein the data is determined such that the duration of the period of time in which a frequency of access to the management apparatus is high is longer than the duration of the period of time in which the frequency of access to the management apparatus is low.

9. The information processing apparatus according to claim 1,
wherein the selection unit selects a time which is randomly selected from the time range as the access time to the management apparatus.

10. The information processing apparatus according to claim 2,
wherein the selection unit selects a time which is randomly selected from the time range as the access time to the management apparatus.

11. The information processing apparatus according to claim 3,
wherein the selection unit selects a time which is randomly selected from the time range as the access time to the management apparatus.

12. The information processing apparatus according to claim 4,
wherein the selection unit selects a time which is randomly selected from the time range as the access time to the management apparatus.

13. The information processing apparatus according to claim 5,
wherein the selection unit selects a time which is randomly selected from the time range as the access time to the management apparatus.

14. The information processing apparatus according to claim 6,
wherein the selection unit selects a time which is randomly selected from the time range as the access time to the management apparatus.

15. The information processing apparatus according to claim 7,
wherein the selection unit selects a time which is randomly selected from the time range as the access time to the management apparatus.

16. The information processing apparatus according to claim 8,
wherein the selection unit selects a time which is randomly selected from the time range as the access time to the management apparatus.

17. A non-transitory computer readable medium storing a program that causes a computer to function as:
an acquiring unit that acquires data from a management apparatus indicating a respective duration for dispersing access to the management apparatus for each of a plurality of periods of time;
an inputting unit that inputs time to access the management apparatus, which is designated by a user;
a specifying unit that specifies one of the respective durations corresponding to the time which is designated by the user on the basis of the acquired data;
a selection unit that selects an access time to the management apparatus from a time range based on the designated time and the one of the respective durations specified by the specifying unit; and
a unit that accesses the management apparatus on the basis of the access time selected by the selection unit.

18. An information processing method utilizing a processor of a computer comprising:
acquiring data from a management apparatus indicating a respective duration for dispersing access to the management apparatus for each of a plurality of periods of time;
receiving a time to access the management apparatus, the time being designated by a user;
specifying one of the respective durations corresponding to the time which is designated by the user on the basis of the acquired data;
selecting an access time to the management apparatus from a time range based on the designated time and the one of the respective durations; and
accessing the management apparatus on the basis of the selected access time.

19. An information processing system comprising:
a management apparatus; and
an information processing apparatus, including an inputting unit a inputs time to access the management apparatus, which is designated by a user;
wherein the management apparatus includes:
a processor configured to act as:
an acquiring unit that acquires data indicating a respective duration for dispersing access to the management apparatus for each of a plurality of periods of time,
a specifying unit that specifies one of the respective durations corresponding to the time which is designated by the user on the basis of the acquired data,
a selection unit that selects an access time to the management apparatus from a time range based on the designated time and the one of the respective durations specified by the specifying unit, and
a notifying unit that notifies the information processing apparatus of the access time selected by the selection unit, and
the information processing apparatus includes:
a unit that accesses the management apparatus on the basis of the access time notified by the notifying unit.

* * * * *